(12) United States Patent
Behere et al.

(10) Patent No.: US 11,902,083 B1
(45) Date of Patent: Feb. 13, 2024

(54) TECHNIQUES TO PROVIDE A FLEXIBLE WITNESS IN A DISTRIBUTED SYSTEM

(71) Applicant: Cisco Technology, Inc., San Jose, CA (US)

(72) Inventors: Shweta Manohar Behere, Milpitas, CA (US); Dhanesh Joshi, Cupertino, CA (US); Jonathan S. Gorlin, Denver, CO (US); Song Lu, San Jose, CA (US); Sean Joseph Hagan, Wilton, CT (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/529,376

(22) Filed: Nov. 18, 2021

Related U.S. Application Data

(60) Provisional application No. 63/229,601, filed on Aug. 5, 2021.

(51) Int. Cl.

| | |
|---|---|
| G06F 15/173 | (2006.01) |
| G06F 15/16 | (2006.01) |
| H04L 41/0604 | (2022.01) |
| H04L 67/1034 | (2022.01) |
| H04L 41/0654 | (2022.01) |
| H04L 67/133 | (2022.01) |

(52) U.S. Cl.
CPC ...... *H04L 41/0627* (2013.01); *H04L 41/0654* (2013.01); *H04L 67/1034* (2013.01); *H04L 67/133* (2022.05)

(58) Field of Classification Search
CPC . H04L 67/1044; H04L 41/06; H04L 41/0654; H04L 67/1034; H04L 67/133; H04L 41/0627

USPC ........................ 709/223–224, 250, 202–203
See application file for complete search history.

(56) References Cited

U.S. PATENT DOCUMENTS

| | | | |
|---|---|---|---|
| 5,948,109 A | 9/1999 | Moiin et al. | |
| 8,521,860 B2 * | 8/2013 | Prahalad | H04L 67/142 |
| | | | 709/224 |

(Continued)

FOREIGN PATENT DOCUMENTS

CN           112732492 A       4/2021

OTHER PUBLICATIONS

Jason Gerend et al., "Deploy a Cloud Witness for a Failover Cluster", Microsoft Docs, Jul. 14, 2021, 12 pages; https://docs.microsoft.com/en-us/windows-server/failover-clustering/deploy-cloud-witness.

*Primary Examiner* — Bharat Barot
(74) *Attorney, Agent, or Firm* — Edell, Shapiro & Finnan, LLC

(57) ABSTRACT

A flexible witness service system architecture is provided that comprises one or more cluster sites each having at least two storage/compute nodes; at least one local external device associated with at least one of the one or more cluster sites, the at least one local external device configured to run a local witness service. A central cloud management platform is in communication with the one or more cluster sites, the central cloud management platform being configured to run a cloud witness service. The local witness service and the cloud witness service perform identical arbitration services if a storage/compute node in one of the one or more cluster sites fails or communication between storage/compute nodes in a cluster fails.

21 Claims, 6 Drawing Sheets

(56) References Cited

U.S. PATENT DOCUMENTS

| | | | |
|---|---|---|---|
| 8,578,204 B1* | 11/2013 | Ortenberg | G06F 11/1425 |
| | | | 714/4.11 |
| 10,664,366 B2 | 5/2020 | Schatz et al. | |
| 10,833,918 B2* | 11/2020 | Shang | H04L 41/0654 |
| 11,194,680 B2* | 12/2021 | Konka | H04L 41/0668 |
| 11,218,418 B2* | 1/2022 | Gupta | H04L 67/10 |
| 11,681,593 B2* | 6/2023 | Jindal | G06F 11/2023 |
| | | | 714/11 |
| 2012/0254001 A1* | 10/2012 | Ran | G06Q 10/103 |
| | | | 709/227 |
| 2012/0254396 A1* | 10/2012 | Prahalad | H04L 67/142 |
| | | | 709/224 |
| 2015/0106516 A1 | 4/2015 | Prahalad et al. | |
| 2017/0078435 A1 | 3/2017 | Babol et al. | |
| 2019/0245735 A1 | 8/2019 | Umezawa | |
| 2020/0036647 A1* | 1/2020 | Gupta | H04L 67/10 |
| 2020/0137157 A1 | 4/2020 | Joseph et al. | |
| 2021/0120070 A1* | 4/2021 | Ponce | H04L 67/06 |
| 2022/0229746 A1* | 7/2022 | Jindal | G06F 11/2023 |

* cited by examiner

TECHNIQUES TO PROVIDE A FLEXIBLE WITNESS IN A DISTRIBUTED SYSTEM

CROSS-REFERENCE TO RELATED APPLICATION

This application claims priority to U.S. Provisional Application No. 63/229,601, filed Aug. 5, 2021, the entirety of which is incorporated herein by reference.

TECHNICAL FIELD

The present disclosure relates to witness functionality for use in distributed systems.

BACKGROUND

Fault tolerance is important in large distributed systems to provide continuous availability. Distributed systems are made up of several nodes which are placed in different geographical locations. Quorum-based voting mechanisms are typically used to enforce consistent operation. Each node casts a vote and every data operation needs a majority of votes to complete the operation successfully. This works well when there are no failures in the system. If there is an unequal partition of the nodes, the majority partition will continue to operate and serve data. However, when there is an equal network partition (split-brain scenario) and both partitions have the same number of nodes available, then a witness on a third site is the decision-maker and its vote is used to form a quorum along with one of the partitions. Usually, the witness node, commonly implemented as a witness virtual machine, is placed in a datacenter and the other nodes maintain connectivity to it. Maintenance of the witness node in the datacenter can be cumbersome. It needs frequent bug fixing, security updates, configuration backups, physical infrastructure, high availability design, and additional administrative overhead.

DESCRIPTION OF EXAMPLE EMBODIMENTS

Overview

Figure 1:
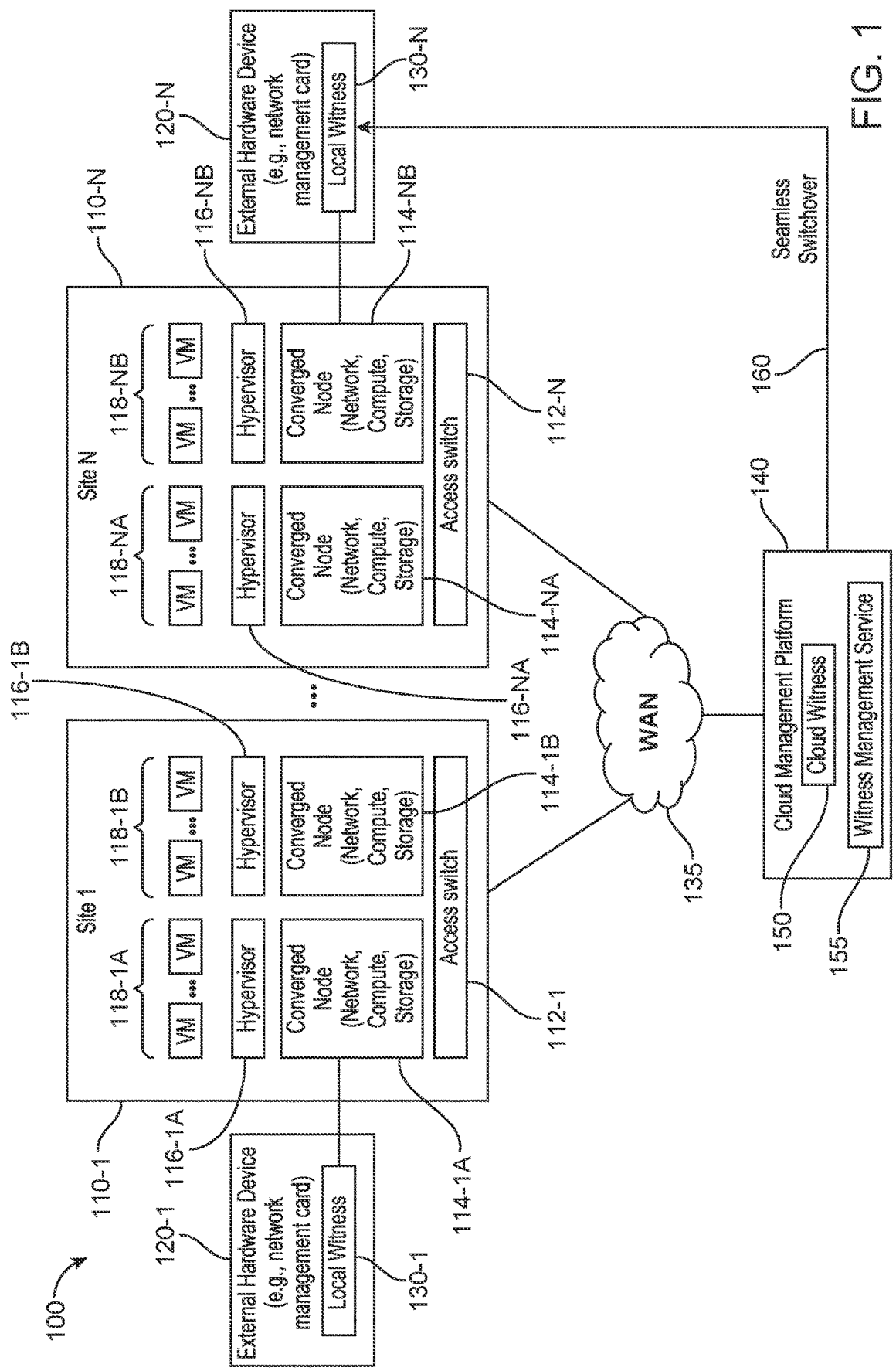
FIG. 1 is a block diagram of a system in which a witness service may be deployed on multiple platforms to provide a highly flexible witness service architecture, according to an example embodiment.

Presented herein are techniques to provide complete flexibility for running a witness server. These techniques provide a level of abstraction of the witness server and ensure that it can be adapted for various environments using relatively simple logic. A flexible witness service system architecture is provided that comprises one or more cluster sites each having at least two storage/compute nodes; at least one local external device associated with at least one of the one or more cluster sites, the at least one local external device being configured to run a local witness service; and a central cloud management platform in communication with the one or more cluster sites, the central cloud management platform configured to run a cloud witness service. The local witness service and the cloud witness service perform identical arbitration services if a storage/compute node in one of the one or more cluster sites fails or communication between storage/compute nodes in a cluster fails. Furthermore, the local witness service and the cloud witness service are instantiations of a witness server and are reachable by a uniform service interface that is configured to allow for deployment of the witness server on different types of computing platforms and portability of the witness server across the different types of computing platforms.

Example Embodiments

The embodiments presented herein relate to distributed systems and how they maintain a quorum and operate when an application is distributed across multiple servers reachable over a network. Generally, in distributed systems, when there are different nodes and each node gets to cast a vote, and once the system has a majority of votes it can continue with its data operations. That is how it is possible to confirm that there is consistency of data and there are a majority of nodes to perform any operation. This works fine under healthy operating conditions.

Once failures occur, this approach can become a challenge. There are many types of failures that are possible, such as nodes going down. Additionally, when there is a network partition between the nodes, this means that a certain set of nodes cannot communicate with another set of nodes. The majority partition can continue to operate because it will still have a quorum—a majority of votes from the nodes. The cluster can continue to operate, but if there are an equal number of number of nodes on both sides of a partition, then it is difficult to determine which side will continue to operate to keep the cluster functioning, because of the equal voting situation. This is called a "split brain" scenario, which is quite common in distributed systems. For any data operation to continue, it needs a majority of the votes. The witness node serves as a tiebreaker vote to help a set of nodes to continue operation in the event of a failure. The witness plays the deciding role, and is generally deployed in a data center and all the other nodes need to have connectivity to it. Both sides of the partition would have connectivity to the witness and the witness gets the deciding vote for selecting which set of nodes (which side of the partition) can continue operation. Thus, there is a need for ongoing patching, backups, maintenance, and additional infrastructure needed at the location where the witness is deployed in order to achieve the desired high availability.

Storage network operators are looking to deploy in as many remote locations as possible. As storage network operators continue to expand into new use cases, there has developed a need for a secondary option to be able to place the witness local to the cluster. The goal is to eliminate any dependency on the wide area network (WAN) or any network backhaul to the witness running in another physical location. While the cluster can remain healthy and operational when faced with a WAN or network outage, it does affect the ability for the cluster to tolerate a node failure. The purpose of a local witness is to provide a more reliable mechanism to be able to tolerate cascading failure scenarios—i.e. losing both the WAN and a node, without causing disruption to the cluster and the workloads hosted there.

The techniques presented herein provide flexibility for easily deploying storage clusters. Since storage clusters use a witness or arbitrator to prevent split-brain scenarios, an architecture may be used that relies on Software-as-a-Service (SaaS) techniques or an on-premise hosted instance to provide the witnessing service.

According to the embodiments presented herein, instead of placing the witness in a data center, the witness is portable and can be placed anywhere: in the cloud, in a switch or router, etc. A standardized/uniform service interface is provided to lock and unlock the witness. The standardized/uniform service interface may be a set of Application Programming Interfaces (APIs), Remote Procedure Calls (RPCs), a library, command-lets, a Command Line Interface (CLI), etc. Once the service interface is implemented, the witness can run anywhere and the location of the witness can be changed, if needed.

Reference is now made to FIG. 1. FIG. 1 shows a block diagram of a system 100 according to an example embodiment. The system 100 includes one or more cluster sites 110-1-110-N each having at least two storage/compute nodes, as described further below. The system further includes at least one local external hardware device associated with at least one of the one or more cluster sites, the local external hardware device configured to run a local witness service. For example, there is an external hardware device 120-1 associated with cluster site 110-1, and a local witness 130-1 is running on the external hardware device 120-1. Similarly, there may be an external hardware device 120-N associated with cluster site 110-N, and a local witness 130-N is running on the external hardware device 120-N. The system 100 further includes a central cloud management platform 140 in communication with the one or more cluster sites 110-1-110-N via wide area network (WAN) 135 and/or a local area network (LAN). The central cloud management platform 140 is configured to run a cloud witness service 150 and a witness management service 155 that is used to manage the various witness services in the system 100. The external hardware device 120-1 to 120-N on which the local witness 130-1 to 130-N may run may be, for example, a network management/interface card, switch, router, or any device that can run a container virtualization service, such as a Docker™ container. Containers are isolated from one another and bundle their own software, libraries and configuration files; they can communicate with each other through well-defined channels.

As described in more detail below, the local witness service (local witness) 130-1 to 130-N and the cloud witness service (cloud witness) 150 perform identical arbitration services in the event that a storage/compute node in one of the plurality of cluster sites 110-1-110-N fails or communication between storage/compute nodes in a cluster fails. Moreover, the local witness services 130-1 to 130-N and the cloud witness service 150 are (substantially identical) instantiations of a witness server and are reachable by a uniform service interface that is configured to allow for deployment of the witness server on different types of computing platforms and portability of the witness server across the different types of computing platforms.

As shown in FIG. 1, each cluster site may include two storage/compute/network nodes, called converged nodes, an access switch, a hypervisor and a plurality of virtual machines (VMs) that run on the hypervisor. Specifically, cluster site 110-1 includes an access switch 112-1 and at least two converged nodes 114-1A and 114-1B. In cluster site 110-1 there is a hypervisor 116-1A associated with node 114-1A and a hypervisor 116-1B associated with node 114-1B. Furthermore, there are a plurality of VMs 118-1A that run on hypervisor 116-1A and a plurality of VMs 118-1B that run on hypervisor 116-1B. Similarly, cluster site 110-N includes an access switch 112-N, at least two storage/compute nodes 114-NA and 114-NB, hypervisors 116-NA and 116-NB and a plurality of VMs 118-NA and 118-NB. The cluster sites 110-1-110-N may be Remote Office or Branch Office (ROBO) nodes or used in a data center solution offering.

As shown in FIG. 1, some distributed clusters always have wide area network (WAN) connectivity and can benefit from a cloud-based witness (cloud witness 150) while other clusters can have limited access to WAN and can prefer a local witness (local witness 130-1-130-N). For such installations, the witness server can run on a local embedded device or even on a local webserver. The local witnesses 130-1 to 130-N provides the witness service functionality directly on a hardware device (e.g., a network management card (NMC) supporting the cluster, as shown in FIG. 1). This provides a local witness service to enable a high availability solution at the edge. As will be described further below in connection with FIG. 4, one witness can handle multiple clusters.

This witness is portable to different types of hardware/computing platforms. Thus, the witness could be done as an embedded piece of hardware (e.g., local witnesses 130-1 to 130-N) or could be embodied as SaaS running in the cloud (e.g., cloud witness 150). The service interface is ubiquitous across different platforms and allows for the ability to move the witness around. The witness services can start with a cloud version (cloud witness 150), then move it to a local piece of hardware (local witnesses 130-1 to 130-N) if higher availability is desired, and then move it back to the cloud. The local witnesses 130-1 to 130-N and cloud witness 150 are ubiquitous and can be moved around. The system 100 allows for seamless switchover/mobility of witnessing, as depicted at 160 in FIG. 1.

Using a local witness, it is possible to leverage the same lightweight protocol and design used in a centralized management architecture, but provide higher availability guarantees when desired by the end user. This local witness can take many forms—from embedded systems to software only (e.g., Docker™ container).

The system 100 further includes witness monitoring and management. The system 100 could include hundreds of distributed sites, e.g., number stores of a retail chain. Each store is has a cluster that needs a witness. The cloud witness 150 could be used for all of the stores, or could manage local witnesses inside each of the stores. Then, with the possibility of having numerous witnesses, the cloud management platform 140 executes the witness management service 155 that provides central management of the various witness services in the system 100. This allows for deploying witness instances at scale across distributed sites, but also have centralized management over the witnesses. Moreover, a given witness instance may take over responsibility to become a presiding witness for a period of time, and then may be released so that another witness instance can take over and become the presiding witness.

The service interface, described in more detail below, allows for flexibility of override and manipulation, for witness locking, unlocking, etc. The same (uniform) service interface is implemented across all of the witness service instantiations. This allows for moving the presiding witness service state around between witness service instantiations without any downtime and service restart.

The witness management service 155 is configured to monitor the various local witnesses 130-1-130-N to determine if a particular local witness is having problems at different sites. The cloud management platform 140 can generate an alert and determine which sub-sites of numerous sites are impacting by a particular witness having a problem/failure. The cloud management platform 140 obtains alarm and telemetry information from the local witnesses at the respective sites.

Local Witness for Two-Node Clusters

As explained above, one witness option is to use an external (also called a local) witness for clusters that demand high levels of availability. Based on the same protocol used by the cloud witness 150, this external, or local, witness option operates without any dependency on network connectivity back to the cloud management platform 140.

As one example, a local witness server may run on an Uninterruptible Power Supply (UPS) network management card (NMC). A UPS is commonly used at edge locations to protect equipment and data against any unexpected power failures or power anomalies. The witness protocol for two-node clusters may be deployed directly into the NMC card, thus operating as a third vote for a quorum. There is no need for new infrastructure, dedicated software patching, or another device on the network.

The same cloud-like manageability benefits of the cloud witness 150 are realized in the integrated local witness. The solution is ready to use with no deployment or complex setup other than enabling the witness server in the external hardware device (in one example, an NMC) and then configuring the local cluster to use the external hardware device. Security patching is handled at the external hardware device firmware level without the need to monitor and patch a dedicated witness server on the network. Additionally, there is no extra infrastructure to invest in to host witness VMs. In one example, an NMC can support up to 64 clusters for demanding environments with many clusters. Finally, the solution may be built on a hardened, embedded operating system native to the external hardware device and is powered by the UPS itself, ensuring the highest levels of resiliency for a local witness. Thus, in one example, the NMC not only functions as a witness server, but it also brings numerous additional benefits to the remote environment: power protection, orchestrated shutdown, environmental monitoring, power monitoring, alerting, and more.

Switching a two-node cluster from using the cloud witness to an external local witness is a simple and non-disruptive operation. A network administrator configures the IP address, username, and password from a user interface screen.

Figure 2:
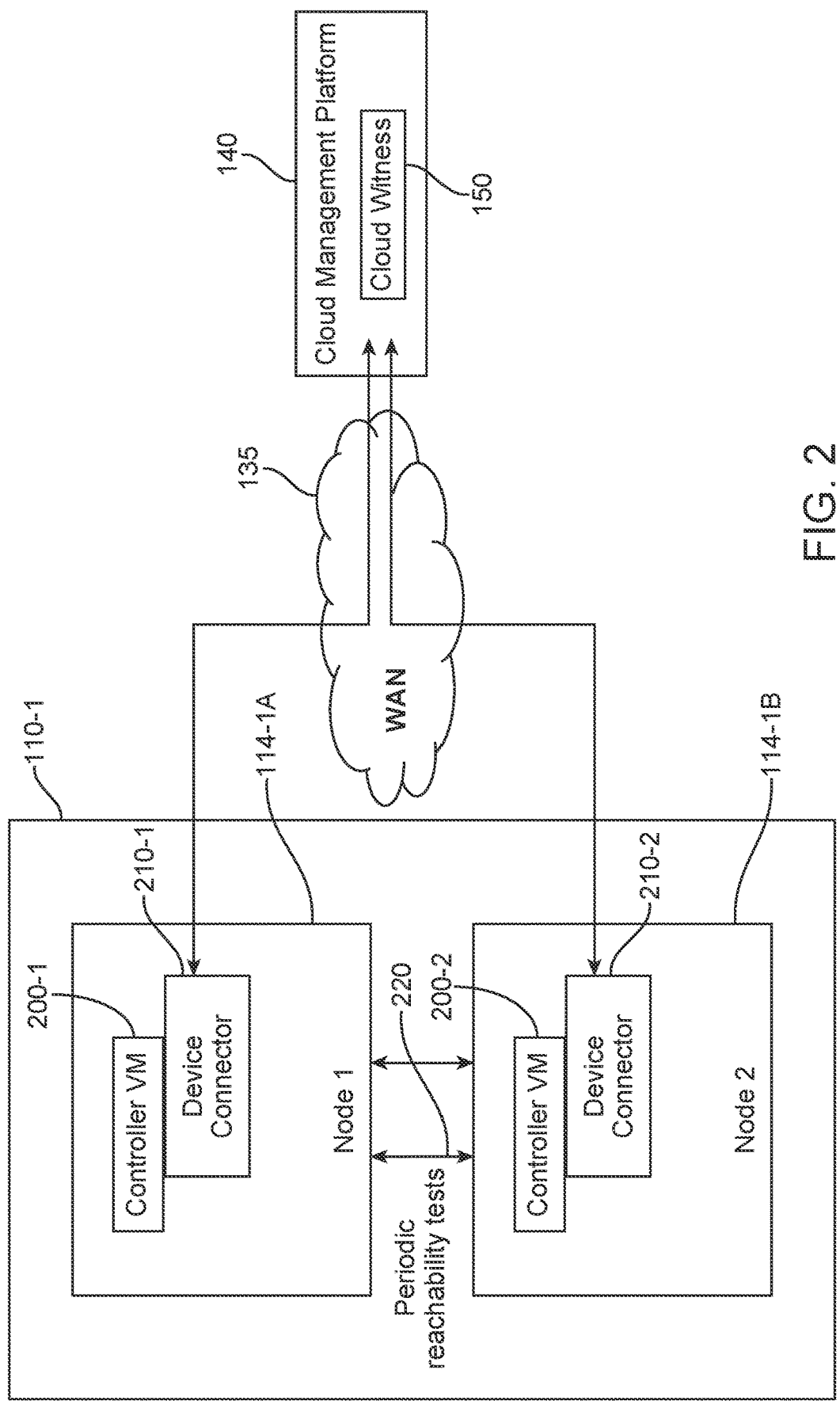
FIG. 2 is a more detailed block diagram illustrating communications between a cloud witness and nodes within a cluster site, according to an example embodiment.

Reference is now made to FIG. 2. FIG. 2 illustrates is a high-level functional diagram depicting cloud witness set up and operation with respect to the storage/compute nodes 114-1A and 114-1B of cluster site 110-1, as an example. Each cluster node includes a controller VM and a connector function. For example, node 114-1A includes a controller VM 200-1 and device connector 210-1. Similarly, node 114-1B includes a controller VM 200-2 and device connector 210-2.

The cloud witness 150 does not require any configuration input. Instead, all components are configured transparently during cluster installation. The physical servers are securely claimed in the cloud management platform 140. From that point forward, the cloud witness 150 is automatically deployed and configured.

The cloud management platform 140 uses an embedded device connector inside the controller VMs to deliver management capabilities to the platform. Features enabled by the device connectors include the capability to monitor alarms, view cluster status, and cross-launch into a user interface of the local cluster management user interface from anywhere.

Using this existing software component (the device connectors), the cloud witness 150 communicates over an existing control channel: a secure, persistent web socket between the device connector and the cloud management platform. For two-node clusters only, the cloud management platform 140 also performs arbitration in the unlikely scenario that a node fails or the communication between nodes fails.

Arbitration and avoidance of a split-brain scenario are accomplished by using an internal election protocol that grants the right to continue operating to a single winner. The cloud management platform 140 platform maintains the election state for each remote cluster vote with one of the surviving nodes to help ensure continued cluster operation in the event of a failure.

When a failure is detected, the surviving nodes reach out to the cloud management platform 140 for permission to continue input/output (I/O) operations. The cloud witness 150 grants privileges to only one of the nodes to continue operation. The witness protocol is efficient in that it communicates only under failure conditions.

As shown at 220, the two cluster nodes 114-1A and 114-1B periodically perform reachability tests over a local area network (LAN). If reachability is interrupted because of either a node or a link failure, the process of reaching out to the cloud management platform 140 will begin. The details of this process are described in the failure scenarios below.

The cloud witness 150 requires the controller VM in a respective node to have public Domain Name System (DNS) resolution capabilities and the capability to initiate an outbound Transmission Control Protocol/Hypertext Transfer Protocol Secure (TCP/HTTPS) Internet connection on port 443 to the cloud management platform 140. These requirements may be fulfilled by allowing outbound Network Address Translation (NAT) operations from the subnet assigned to the management traffic.

The cloud witness Lock interface is available only through the device connectors in a node that are connected to a cloud management platform 140. Each device connector has exclusive access to its individual Lock object in the cloud management platform 140 for both reads and writes. The device connectors running on each cluster have an associated unique identity, generated on registration to the cloud management platform 140, which is verified by the cloud management platform 140 using, for example, a key pair on connection establishment. This identity is then carried in each message sent to the cloud management platform 140 by the device connector, including the cloud witness lock interfaces. The cloud witness 150 uses this identity to enforce the request and has access only to its own witness lock object. Each cluster's lock object is stored by the cloud management platform 140 in a storage service with the associated device connector identity. The cloud management platform 140 enforces that the identity carried in the service interface request matches the identity stored in the lock object.

The device connectors can switch between the cloud witness and local witnesses, and vice versa. Switching between witness services is described further below.

Before witness switchover occurs, the device connector ensures that the /health service interface is reachable (server is up, credentials are correct, and witness server is running) on the witness server. If switching from a local witness to the cloud witness, the device connector will ensure the cloud management platform is reachable before continuing. Before switchover, the device connector also ensures that the cluster does not have an outstanding lock on the new witness; it should be null at time of switchover. Cluster health will also be checked. Generally, witness changeover cannot occur if the current cluster is running on a single node. Changeover must be possible if the cluster is healthy but the original witness is gone (e.g. witness server is no longer functional).

The embodiments presented herein are designed so that there is no single point of failure, and service is not disrupted even when individual components fail. Common points of failure may include:

Nodes (power, hardware, and software failures)
LAN links and switches
WAN links and routers It is expected that if any single component fails, the cluster and workloads will remain online and operational.

However, two-node clusters in general are not designed to handle all combinations of simultaneous failures at the same time. The system is, however, designed to be able to suffer a failure, eventually return to a healthy state (in many cases automatically), and then tolerate another failure at some point in the future.

Loss of WAN Connectivity

In case of loss of WAN connectivity to the cloud management platform, the entire site loses WAN connectivity to the cloud management platform 140. During the WAN outage, the nodes and all workloads continue to operate uninterrupted. Operation is not interrupted because communication to the cloud witness 150 is required only when a local failure of a LAN link, switch, or node occurs.

When the WAN link is down and the cloud management platform 140 is not reachable, additional LAN or node failures cannot be tolerated.

When WAN connectivity is restored, the device connector function in each node automatically reconnects to help ensure that the cluster can tolerate a LAN or node failure. The device connectors have a built-in retry mechanism that quickly reconnects whenever WAN service is restored. The current status of connectivity to the cloud witness can be monitored using CLI commands or launching a user interface function on the local cluster.

Node Failure

As explained above, a node may fail as a result of a hardware or software failure. When the local reachability test fails, the surviving node immediately reaches out to the witness management service 155 running on the cloud management platform 140 to obtain permission to continue operating. If the election state is clean for this cluster, meaning that the other node has not been granted the right to continue operating, the cloud management platform 140 will return a success response, and the cluster will continue to operate on the single surviving node.

The VMs that were running on the failed node will be automatically restarted on the surviving node. The VMs that were on the surviving node will continue to operate without interruption.

When the failed node is recovered, the reachability test between nodes will succeed, and the surviving node will relinquish control. This process will clear the state from cloud management platform 140 so that future failures can be tolerated. Next, the restored node is resynchronized with the surviving node, and the cluster will become fully healthy again. From this healthy state, fault tolerance is restored, and any new failure scenario can be tolerated again.

Loss of Connectivity Between Nodes

There are two scenarios that may occur.

Scenario A: Single link loss between nodes. If a single direct-connect cable or a single network uplink is severed, all services will immediately fail over to the secondary link, and no additional action is required. The running cluster is not affected. After the link is restored, the services that failed over will fail back to their original failover priority, and network fault tolerance will be restored.

Scenario B: All links between nodes are lost. If both direct-connect cables are lost, or if switching infrastructure or both uplinks from any node to the switch are lost, an election process occurs. When the local reachability test fails, both nodes will immediately reach out to the cloud management platform 140. Only one node will win the election. This winning node will continue to operate, and the rejected node will enter a suspended state. After connectivity is restored, the reachability test between nodes will succeed and the operating node will clear the election state from the cloud management platform 140 so that future failures can be tolerated. Next, the previously offline node is resynchronized, and the cluster will become fully healthy. From this healthy state, any new failure scenario can now be tolerated.

Node Failure Followed by WAN Failure

This case shows what happens when first a node fails as a result of a hardware or software failure and then the WAN fails while the cluster is operating with a single node.

When the node fails, the behavior will be the same as described above. After the cluster has reached a steady state and is operating on a single node, if the WAN subsequently suffers an outage, there is no impact on the system. This situation is explained in failure case 1. Because the cluster was able to failover to a single node before the WAN outage, there is no need for additional communication with the witness server until the failed node is recovered.

Recovery scenario 1: If the WAN comes back online first, the recovery procedure is the same as described above.

Recovery scenario 2: If the failed node recovers first, the recovered node will synchronize with the surviving node and resume I/O operations. In this state, the cluster cannot tolerate any node failures without affecting I/O operations. After connectivity to the cloud management platform 140 is reestablished, the cluster will synchronize with the cloud witness 150 and regain the default high availability state for a healthy cluster.

WAN Failure Followed by Node Failure

As explained above, if WAN reachability to the cloud witness 150 is down, another subsequent failure cannot be safely achieved without interrupting I/O operations. To maintain data consistency, the cluster may stall temporarily and be subject to the following recovery scenarios.

Recovery scenario 1: If the WAN recovers first, the surviving node will resume operations serving I/O, by achieving a quorum with the cloud management platform 140. Depending on the length of the WAN outage, some virtual machines may experience an all-paths down (APD) condition. However, some virtual machines may require manual remediation depending on the application's tolerance of I/O interruption.

The cluster is now fully operational on a single node. At some later time, the failed node will be recovered. In this case, the same node recovery process as described above is followed to admit the node back into the cluster and achieve fault tolerance again.

Recovery scenario 2: If the failed node recovers first, the recovered node will synchronize with the surviving node and resume I/O operations. In this state, the cluster cannot tolerate any future node failures without affecting I/O operations. After connectivity to the cloud management platform 140 is reestablished, the cluster will synchronize with the cloud witness and regain the default high availability state for a healthy cluster.

Witnessing services are achieved by the techniques presented herein through a locking mechanism performed on the witness server. In steady state, the witness is not used. Only during failure scenarios, particularly node failure or local network connectivity failures, is the witness consulted for quorum decision. Both nodes may attempt to race for the lock. It is the responsibility of the witness server to only ever allow one lock per cluster, to serve as an additional vote to keep the cluster running on the winning node.

Figure 3:
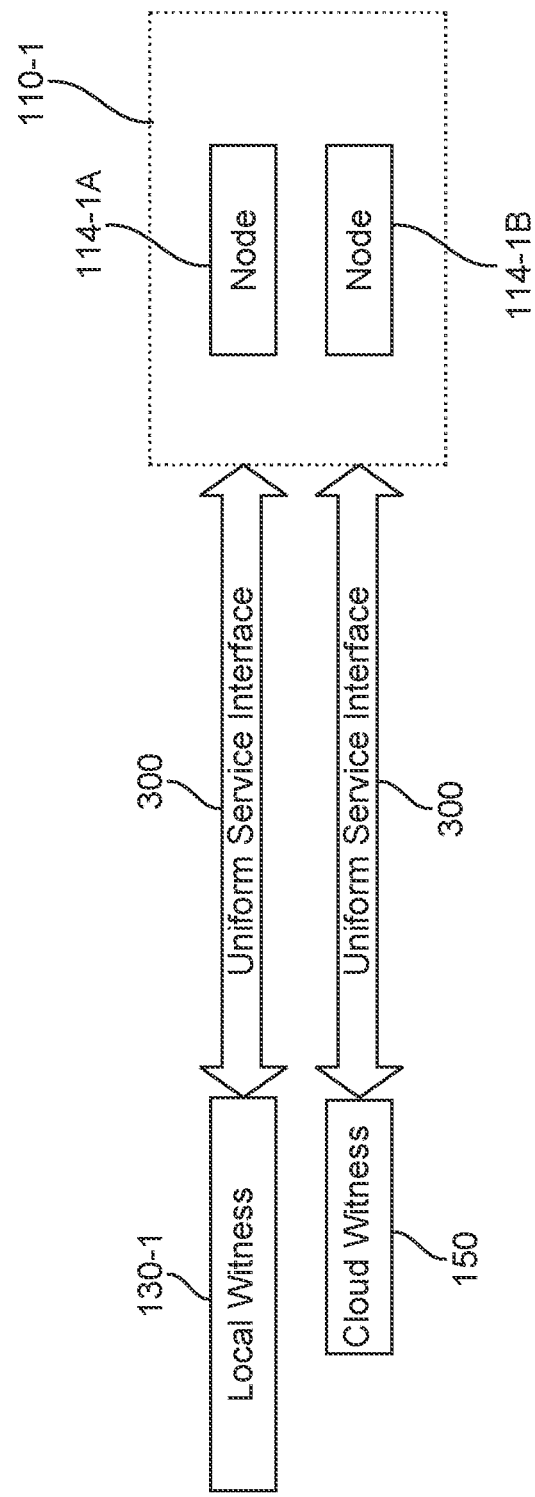
FIG. 3 is a diagram showing interactions between a local witness and a cloud witness via a uniform service interface, according to an example embodiment.

Reference is now made to FIG. 3. FIG. 3 depicts a uniform service interface 300 that is used to enable communications between a presiding witness and a node in a cluster. For the sake of completeness, a cluster site 110-1 is shown with nodes 114-1A and 114-1B. Both a local witness, e.g., local witness 130-1 and the cloud witness 150, communicate with a node using an instantiation of the uniform service interface 300. The uniform service interface 300 may be one of: an API, a RPC, command-lets, a CLI, or a library, as an example. As explained above, the local witness 130-1 and the cloud witness 150 cannot be the presiding witness for a node at the same time, but FIG. 3 is meant to illustrate that the local witness and the cloud witness communicate with a node using the same uniform service interface.

The following is a description of the uniform service interface in the form of an API, as an example. The service interface provides several arbitration functions as listed in the table below.

| API Endpoint | Function |
| --- | --- |
| health | Determines witness reachability |
| Lock | Obtains the lock for a specific node in a cluster |
| Unlock | Releases the lock for a specific node in a cluster |
| GetOwner | Queries for the current lock state (null, node 1 ID, or node 2 ID) |

An approach is presented herein in which a set of APIs are provided that ensure that the witness node ("witness") can be implemented on any platform such as the cloud (as a SaaS offering), a container, web service, a network switch, or even an embedded device such as a UPS network management card. The APIs are simple to implement and provide a level of abstraction that lets the witness run anywhere. The APIs provide a lock/unlock mechanism. Whenever there is a spilt brain scenario (the nodes are partitioned such that there are equal number of nodes in the partition), the witness decides which partition can continue to operate as it can cast the deciding vote. When the split-brain occurs, the nodes from both the partitions race to the witness to obtain a Lock. The witness APIs guarantee that a single node obtains the Lock under all circumstances. Whichever node obtains the Lock, the partition containing that node can continue to operate. Once the failure resolves and the network partition goes away, the node that obtained the Lock can now communicate with the nodes from the other partition. Thus, the node which owns the Lock now calls the Unlock API on the witness server. Once the Unlock is called, the system continues to operate as before. The APIs allow unlocking only if the node holding the Lock calls the Unlock API. Other nodes are forbidden to Unlock if they do not own the Lock.

In other words, the API (or more generally, a uniform service interface) supports a lock/unlock mechanism that includes a lock state and an unlock state, wherein the lock/unlock mechanism allows for a particular partition at a given cluster site having multiple partitions to obtain a deciding vote from the presiding witness service as to which partition of the given cluster site is to continue to operate when there is a failure in the given cluster site. The uniform service interface is configured to guarantee that the particular partition obtains the lock state from the presiding witness service under all circumstances, and such that whichever partition obtains the lock state, a partition of the given cluster site that obtains the lock state continues to operate, and when the failure in the given cluster site resolves, the partition that obtained the lock state can communicate with one or more storage/compute nodes from another partition of the given cluster site. The uniform service interface is configured to enable the presiding witness service to respond to a request from the partition that obtains the lock state to switch to the unlock state, allowing the given cluster site to continue operation as before the failure.

Details of the witness APIs are as follows. All commands may be sent over a secure connection, such as a Transport Layer Security (TLS) protocol 1.2, connection and uses the Hypertext Transfer Protocol (HTTP), as an example. The default port number of 443 can be used but can be overridden by the user. The Universal Resource Locator (URL) structure may optionally include a subdirectory for the witness endpoints.

In all places below, <server> can be replaced with the IP address or Fully Qualified Domain Name (FQDN) of the server. FQDN involves DNS resolution to be operable on a cluster.

1. Lock

GET https://<server>:443/<optional path>/Lock?clusterID=<>&nodeID=<>

Attempt to acquire the lock. Returns 200 if the lock is successfully acquired or already owned by this node.

Returns 403 if the lock is held by another node.

Returns 500 if the witness is not reachable.

Returns 401 if the client is not authorized.

2. Unlock

GET https://<server>:443/<optional path>/Unlock?clusterID=<>&nodeID=<>

Attempt to release the lock. Returns 200 if the lock is owned by this node and is successfully released.

If no lock exists, the call is a no-op and returns 200.

Returns 403 if the lock is held by another node.

Returns 500 if the witness is not reachable.

Returns 401 if the client is not authorized.

3. Get Owner

GET http://<server IP>:port/<optional path>/GetOwner?clusterID=<>&nodeID=<>

Retrieve the current lock owner. Returns 200 and the node ID of the lock owner in the response body (if no owner returns empty).

Returns 500 if the witness is not reachable.

Returns 401 if the client is not authorized.

4. Health

GET https://<server IP>:443/<optional path>/health?clusterID=<>&nodeID=<>Returns 200 and body "Witness service is alive and healthy at <current time>" if the device is connected to the witness server and is reachable.

Returns 500 if the witness is not reachable.

Returns 401 if the client is not authorized. A response of 401 would indicate incorrect credentials that should be corrected on the client.

In all the above scenarios the nodeID and clusterID are values generated by the storage platform, and may take on the following syntax as an example:

nodeID is a 128bit UUID hexadecimal string in the following format xxxxxxxx-xxxx-xxxx-xxxx-xxxxxxxxxxxx. A sample node UUID: db868ae5-9ble-d247-83b1-85823f028487.

clusterID is a combination of two unit64 integers concatenated with a colon (:). A sample cluster ID: 5248072541995618188:6877761393210427103.

If direct outbound connectivity is not available, an HTTPS proxy can be configured to enable use of this service. A datacenter may utilize a proxy to forward the service interface interactions to the remote server. The proxy is responsible for proxying between the internal process and the external witness server.

The witness server may strictly follow several semantics. The witness server provides a single lock per cluster. Once a node has obtained a lock, the witness server should never allow another node to obtain the lock until it is cleared by the current owner. Only the node that has obtained the lock can clear the lock. The lock persists on the witness server and can tolerate power losses and device reboots. The witness server should not reply until persistent storage is available. Factory reset of the device should attempt to maintain the lock(s) if possible. This ensures manual intervention is not needed after a factory reset. If persistence is not possible with a factory reset, a warning may be displayed to the user before a factory reset if any cluster currently has an active lock. The user will have to take manual action to recover those clusters. The witness server should be fair to all clients. When a race occurs, the witness server should equally allow either node to win, based strictly upon the first node to reach the witness.

Multi-Cluster Support

Figure 4:
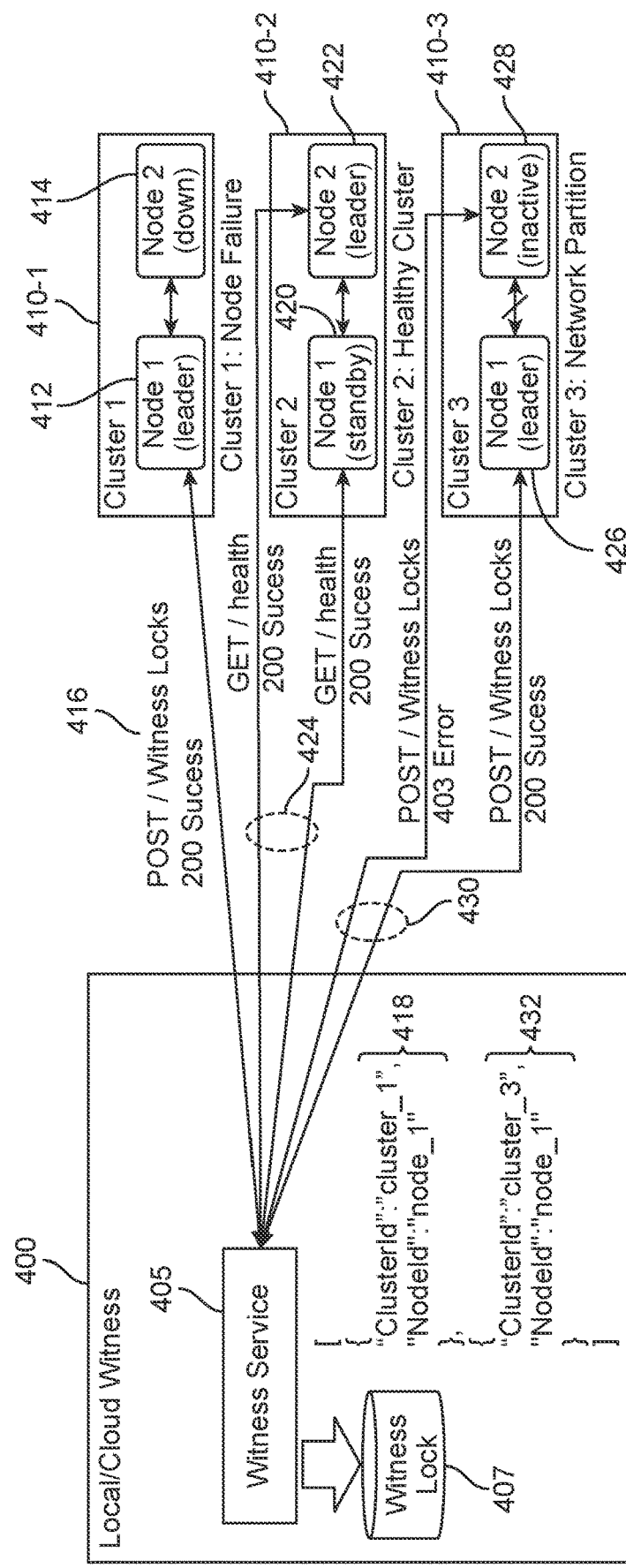
FIG. 4 is a showing support of multiple clusters from a single witness, according to an example embodiment.

This witness server techniques presented herein provide support for multiple clusters. The same semantics presented herein need to be met, with the added ability to maintain a lock per cluster. This enables multiple storage clusters to use the same witness server. Node IDs are specific per cluster and each cluster ID maintains a dedicated locking mechanism. Thus, a single witness server can provide arbitration services to multiple clusters. This is shown in FIG. 4. Specifically, FIG. 4 shows a local or cloud witness 400 running a witness service 405. The witness service 405 maintains witness lock state among multiple clusters in a database 407. The witness service 405 has secure authenticated connections with three clusters, Cluster 1, Cluster 2 and Cluster 3 denoted by reference numerals 410-1, 410-2 and 410-3, respectively, as an example.

Cluster 1 has two nodes 412 and 414, and at a particular instant in time, node 414 is down and node 412 is the leader. For cluster 1, node 412 has obtained Lock on the witness service 405 for Cluster 1. This is shown at reference numeral 416 and in the database 407 as shown at 418.

Cluster 2 has two nodes 420 and 422. At a particular instant of time, both nodes in Cluster 2 are operating normally. The exchanges with the witness service 405 for Cluster 2 are shown at reference numeral 424, where each obtains the health of the witness service 405.

Cluster 3 has two nodes 426 and 428. At this instant of time, connectivity between nodes 426 and 428 has been lost. As a result, the cluster is in a state of a network partition. In this example, nodes 426 and 428 race to obtain lock from the witness service 405, and node 1 wins and is awarded the Lock, whereas node 2 is returned an indication that another node has obtained Lock. This is shown at reference numeral 430, and information is stored in the database 407 to reflect the Lock status for Cluster 3, as shown at 432.

As shown in FIG. 4, this solution is capable of supporting multi-cluster and multi-site deployments. It also supports multiple tenancy with an authentication service being placed along with the witness service. As described in above, the API design carries a cluster ID in the payload that makes both the local witness service and cloud witness service able to handle multiple clusters with a single service. The corresponding witness object model persists the cluster ID and node ID with the granted lock. The API and witness object model design is site neutral. While the local external witness service usually is deployed one per physical site, the cloud witness service can support clusters from different sites. The cloud witness service also provides monitoring of local external witness services from different sites.

Multi-tenancy support may be enabled by the account property in the managed object data model that each lock Managed Object (MO) carries the account information and can only be accessed by the owning account. The account information may be populated at the time when the lock is granted.

The initial setup and configuration may support multi-cluster policy definitions. This may follow a paradigm of implementing reusable policy definitions for mass setup across a large, distributed infrastructure. Users can create a witness configuration and apply it to one or more clusters. This will complete the lifecycle for multi-cluster witness management—1) using policy to initially configure multiple sites, 2) multi-tenancy and segmentation in the witness backend, and 3) broad multi-cluster monitoring and alerting on the witness status.

One aspect of operationalizing the witness comes is how easily the configuration and ongoing monitoring can be performed. The solution presented herein employs a centralized management platform that is used for configuration and monitoring, while the data plane is de-centralized and distributed. This allows the system to achieve the best characteristics of both models: first, centralized management is preferred, particularly with distributed clusters that may be in hundreds or thousands of remote locations. However, the witness server should not be tied to the availability of the remote connectivity back to the centralized management platform. Hence and secondarily, the ability to decouple the witness into a locally operating device, while maintaining centralized visibility, achieves the highest levels of availability while reducing administrative overhead. Any WAN or network outage does not impact the locally running cluster.

This closed-loop control and feedback system is also unique to this witness approach. For example, should the local witness at a remote site fail unexpectedly, the centralized management platform will trip an alarm for a user to go investigate. Centralized management includes configuring the witness servers via centralized, reusable policies; monitoring the local witness server (e.g., connection state, authentication status, etc.); and providing alarms and notifications for remote witness server issues.

The witness service techniques presented herein are abstracted in such a way that one can keep the witness at any location, such as in the cloud or in embedded device with the cluster being unaware of its location or deployment details. Network operators do not need to handle each witness implementation differently. Once they implement the techniques, the witness server can be moved across different platforms.

Existing implementations do not allow the portability of the witness service. In existing implementations, the witness is at a fixed location, and do not allow the migration of the witness to another location. A new cloud-based witness would need to be created and the existing witness removed. This process is error-prone and can make the cluster non-operational. In this solution, the distributed cluster is loosely coupled with the witness and does not depend on the location of the witness. It will be unaware of the witness location when it is migrated from one location to another. Existing solutions also do not allow for high-scale multi-cluster support i.e., a single witness can serve a large number of clusters.

In addition, incorporation of the configuration and monitoring of the witness from a centralized platform is also new to the industry. Typically, witness servers are deployed as one-off solutions without any centralized configuration and monitoring. This solution is a complete end-to-end system for deploying, monitoring, and managing witness servers and their configurations.

As depicted in FIGS. 1 and 2, a system is provided that includes: one or more cluster sites each having at least two storage/compute nodes; at least one local external device associated with at least one of the one or more cluster sites, the at least one local external device configured to run a local witness service; and a central cloud management platform in communication with the one or more cluster sites, the central cloud management platform configured to run a cloud witness service; wherein the local witness service and the cloud witness service perform identical arbitration services if a storage/compute node in one of the one or more cluster sites fails or communication between storage/compute nodes in a cluster fails, and wherein the local witness service and the cloud witness service are instantiations of a witness server and are reachable by a uniform service interface that is configured to allow for deployment of the witness server on different types of computing platforms and portability of the witness server across the different types of computing platforms.

In some aspects, the central cloud management platform is configured to manage the local witness service and the cloud witness service by monitoring connection state and authentication state as between the local witness service and the cloud witness service and the one or more cluster sites.

In some aspects, the local witness service and the cloud witness service are each configured to support multiple cluster sites using a cluster identifier and node identifier for communication via the uniform service interface.

In some aspects, the central cloud management platform is configured to determine which of the cloud witness service and local witness service is a presiding witness service, at any given time, for a corresponding one of the one or more cluster sites.

In some aspects, the central cloud management platform is configured to perform a switchover from the cloud witness service to the local witness service.

In some aspects, the uniform service interface supports a lock/unlock mechanism that includes a lock state and an unlock state, wherein the lock/unlock mechanism allows for a particular partition at a given cluster site having multiple partitions to obtain a deciding vote from the presiding witness service as to which partition of the given cluster site is to continue to operate when there is a failure in the given cluster site.

In some aspects, the uniform service interface is configured to guarantee that the particular partition obtains the lock state from the presiding witness service under all circumstances, and such that whichever partition obtains the lock state, a partition of the given cluster site that obtains the lock state continues to operate, and when the failure in the given cluster site resolves, the partition that obtained the lock state can communicate with one or more storage/compute nodes from another partition of the given cluster site.

In some aspects, the uniform service interface is configured to enable the presiding witness service to respond to a request from the partition that obtains the lock state to switch to the unlock state, allowing the given cluster site to continue operation as before the failure.

In some aspects, the uniform service interface is one of: an Application Programming Interface (API), a Remote Procedure Call (RPC), command-lets, a command-line interface (CLI), or a library.

Figure 5:
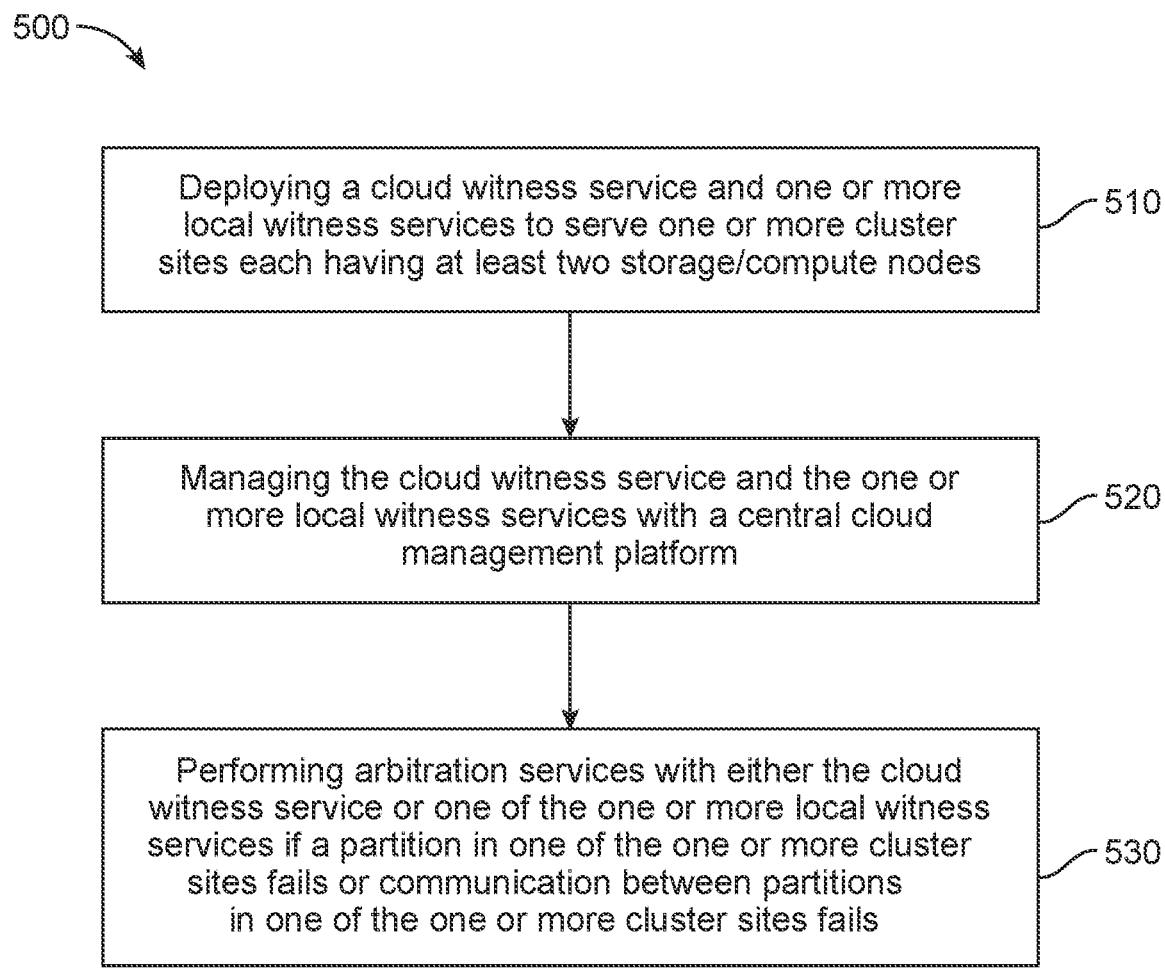
FIG. 5 is a flow chart depicting a flexible witness methodology, according to an example embodiment.

Reference is now made to FIG. 5. In some aspects, a method 500 is provided. The method 500 includes, at step 510, deploying a cloud witness service and one or more local witness services to serve one or more cluster sites each having at least two storage/compute nodes. Step 510 may include signing up for the cloud witness service that has been deployed in the cloud. The one or more local witness services run local to an associated cluster site of the one or more cluster sites. At step 520, the method 500 includes managing the cloud witness service and the one or more local witness services with a central cloud management platform. At step 530, the method includes performing arbitration services with either the cloud witness service or one of the one or more local witness services if a partition in one of the one or more cluster sites fails or communication between partitions in one of the one or more cluster sites fails.

In some aspects, the techniques described herein relate to a method including: deploying a cloud witness service and one or more local witness services to serve one or more cluster sites each having at least two storage/compute nodes, the one or more local witness services running local to an associated cluster site of the one or more cluster sites; managing the cloud witness service and the one or more local witness services with a central cloud management platform; and performing arbitration services with either the cloud witness service or one of the one or more local witness services if a partition in one of the one or more cluster sites fails or communication between partitions in one of the one or more cluster sites fails.

In some aspects, managing includes monitoring connection state and authentication state as between the one or more local witness services and the cloud witness service and the one or more cluster sites.

In some aspects, performing arbitration services includes providing arbitration services by the cloud witness service or one of the one or more local witness services for multiple cluster sites using a cluster identifier and node identifier.

In some aspects, managing further includes: determining which of the cloud witness service and the one or more local witness services is a presiding witness service, at any given time, for a corresponding one of the one or more cluster sites; and performing a switchover from the cloud witness service to one of the one or more local witness services.

In some aspects, the one or more local witness services and the cloud witness service are instantiations of a witness server and are reachable by a uniform service interface that is configured to allow for deployment of the witness server on different types of computing platforms and portability of the witness server across the different types of computing platforms.

In some aspects, the uniform service interface supports a lock/unlock mechanism that includes a lock state and an unlock state, wherein the lock/unlock mechanism allows for a particular partition at a given cluster site having multiple partitions to obtain a deciding vote from the presiding witness service as to which partition of the given cluster site is to continue to operate when there is a failure in the given cluster site.

Figure 6:
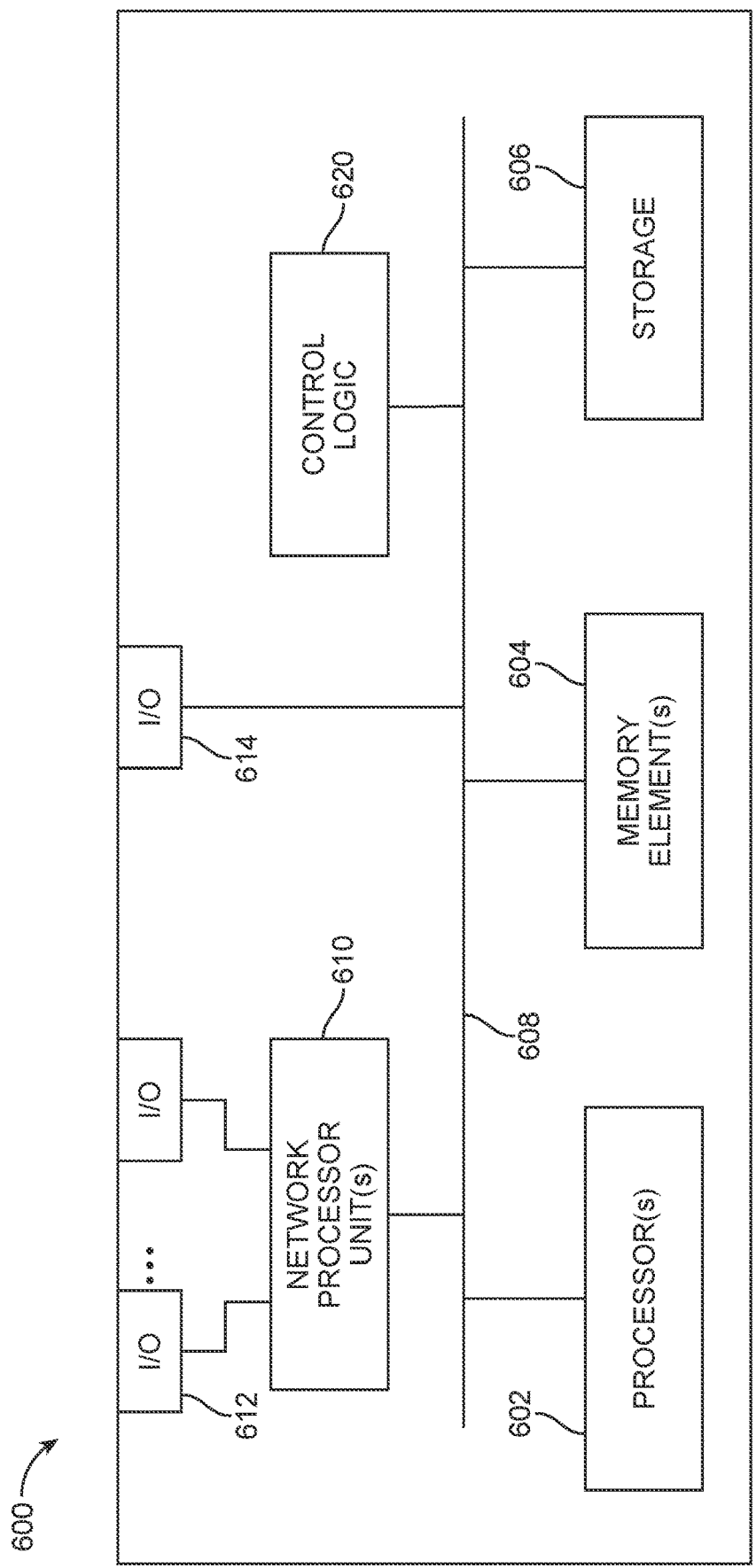
FIG. 6 is a block diagram of a device that may be configured to perform the witness management and other techniques presented herein, according to an example embodiment.

Referring to FIG. 6, FIG. 6 illustrates a hardware block diagram of a computing device 600 that may perform functions associated with operations discussed herein in connection with the techniques depicted in FIGS. 1-5, such as the central cloud management platform 140 that runs the cloud witness 150 and other witness management operations. In various embodiments, a computing device, such as computing device 600 or any combination of computing devices 600, may be configured as any entity/entities as discussed for the techniques depicted in connection with FIGS. 1-4 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to an apparatus including: a communication interface that enables network communication; and a processor coupled to the communication interface, wherein the processor is configured to perform operations including managing a cloud witness service and one or more local witness services that serve one or more cluster sites each having at least two storage/compute nodes, the one or more local witness services running local to an associated cluster site of the one or more cluster sites.

In some aspects, the processor is configured to perform managing by: determining which of the cloud witness service and the one or more local witness services is a presiding witness service, at any given time, for a corresponding one of the one or more cluster sites; and performing a switchover from the cloud witness service to one of the one or more local witness services.

In some aspects, the one or more local witness services and the cloud witness service are instantiations of a witness server and are reachable by a uniform service interface that is configured to allow for deployment of the witness server on different types of computing platforms and portability of the witness server across the different types of computing platforms.

In some aspects, the uniform service interface supports a lock/unlock mechanism that includes a lock state and an unlock state, wherein the lock/unlock mechanism allows for a particular partition at a given cluster site having multiple partitions to obtain a deciding vote from the presiding witness service as to which partition of the given cluster site is to continue to operate when there is a failure in the given cluster site.

In some aspects, either the cloud witness service or one of the one or more local witness services performs arbitration services if a storage/compute node in one of the one or more cluster sites fails or communication between storage/compute nodes in a cluster fails.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A system comprising:
   one or more cluster sites each having at least two storage/compute nodes;
   at least one local external device associated with at least one of the one or more cluster sites, the at least one local external device configured to run a local witness service; and
   a central cloud management platform in communication with the one or more cluster sites, the central cloud management platform configured to run a cloud witness service, and to manage the local witness service and the cloud witness service;
   wherein the local witness service and the cloud witness service are each configured to selectively perform identical arbitration services if a storage/compute node in one of the one or more cluster sites fails or communication between storage/compute nodes in a cluster fails, and wherein the local witness service and the cloud witness service are instantiations of a witness server and are selectively reachable via a uniform service interface that is configured to allow for deployment of the witness server on different types of computing platforms and portability of the witness server across the different types of computing platforms.

2. The system of claim 1, wherein the central cloud management platform is configured to manage the local witness service and the cloud witness service by monitoring connection state and authentication state as between the local witness service and the cloud witness service and the one or more cluster sites.

3. The system of claim 1, wherein the local witness service and the cloud witness service are each configured to support multiple cluster sites using a cluster identifier and node identifier for communication via the uniform service interface.

4. The system of claim 1, wherein the central cloud management platform is configured to determine which of the cloud witness service and local witness service is a presiding witness service, at any given time, for a corresponding one of the one or more cluster sites.

5. The system of claim 4, wherein the central cloud management platform is configured to perform a switchover from the cloud witness service to the local witness service, or from the local witness service to the cloud witness service.

6. The system of claim 4, wherein the uniform service interface supports a lock/unlock mechanism that includes a lock state and an unlock state, wherein the lock/unlock mechanism allows for a particular partition at a given cluster site having multiple partitions to obtain a deciding vote from the presiding witness service as to which partition of the given cluster site is to continue to operate when there is a failure in the given cluster site.

7. The system of claim 6, wherein the uniform service interface is configured to guarantee that the particular partition obtains the lock state from the presiding witness service under all circumstances, and such that whichever partition obtains the lock state, a partition of the given cluster site that obtains the lock state continues to operate, and when the failure in the given cluster site resolves, the partition that obtained the lock state can communicate with one or more storage/compute nodes from another partition of the given cluster site.

8. The system of claim 7, wherein the uniform service interface is configured to enable the presiding witness service to respond to a request from the partition that obtains the lock state to switch to the unlock state, allowing the given cluster site to continue operation as before the failure.

9. The system of claim 1, wherein the uniform service interface is one of: an Application Programming Interface (API), a Remote Procedure Call (RPC), command-lets, a command-line interface (CLI), or a library.

10. A method comprising:
deploying a cloud witness service and one or more local witness services to selectively serve one or more cluster sites each having at least two storage/compute nodes, the one or more local witness services running on one or more external devices local to an associated cluster site of the one or more cluster sites, the cloud witness service running on a central cloud management platform that is remote from the one or more cluster sites;
managing the cloud witness service and the one or more local witness services with the central cloud management platform; and
selectively performing arbitration services with either the cloud witness service or one of the one or more local witness services if a partition in one of the one or more cluster sites fails or communication between partitions in one of the one or more cluster sites fails,
wherein the one or more local witness services and the cloud witness service are instantiations of a witness server and are selectively reachable via a uniform service interface.

11. The method of claim 10, wherein managing comprises monitoring connection state and authentication state as between the one or more local witness services and the cloud witness service and the one or more cluster sites.

12. The method of claim 10, wherein performing arbitration services includes providing arbitration services by the cloud witness service or one of the one or more local witness services for multiple cluster sites using a cluster identifier and node identifier.

13. The method of claim 10, wherein managing further includes:
determining which of the cloud witness service and the one or more local witness services is a presiding witness service, at any given time, for a corresponding one of the one or more cluster sites; and
performing a switchover from the cloud witness service to one of the one or more local witness services, or from one of the one or more local witness services to the cloud witness service.

14. The method of claim 13, wherein the uniform service interface is configured to allow for deployment of the witness server on different types of computing platforms and portability of the witness server across the different types of computing platforms.

15. The method of claim 14, wherein the uniform service interface supports a lock/unlock mechanism that includes a lock state and an unlock state, wherein the lock/unlock mechanism allows for a particular partition at a given cluster site having multiple partitions to obtain a deciding vote from the presiding witness service as to which partition of the given cluster site is to continue to operate when there is a failure in the given cluster site.

16. A system comprising:
one or more cluster sites each having at least two storage/compute nodes;
at least one local external device associated with at least one of the one or more cluster sites, the at least one local external device configured to run a local witness service; and
a central cloud management platform in communication with the one or more cluster sites, the central cloud management platform configured to run a cloud witness service, and to manage the local witness service and the cloud witness service,
wherein the local witness service and the cloud witness service are each configured to selectively perform identical arbitration services if a storage/compute node in one of the one or more cluster sites fails or communication between storage/compute nodes in a cluster fails, and wherein the local witness service and the cloud witness service are instantiations of a witness server and are selectively reachable via a uniform service interface, and
wherein the central cloud management platform is configured to determine which of the cloud witness service and local witness service is a presiding witness service, at any given time, for a corresponding one of the one or more cluster sites.

17. The system of claim 16, wherein the central cloud management platform is configured to manage the local witness service and the cloud witness service by monitoring connection state and authentication state as between the local witness service and the cloud witness service and the one or more cluster sites.

18. The system of claim 16, wherein the local witness service and the cloud witness service are each configured to support multiple cluster sites using a cluster identifier and node identifier for communication via the uniform service interface.

19. The system of claim 16, wherein the central cloud management platform is configured to perform a switchover from the cloud witness service to the local witness service, or from the local witness service to the cloud witness service.

20. The system of claim 19, wherein the uniform service interface is configured to allow for deployment of the witness server on different types of computing platforms and portability of the witness server across the different types of computing platforms.

21. The system of claim 16, wherein the uniform service interface supports a lock/unlock mechanism that includes a lock state and an unlock state, wherein the lock/unlock mechanism allows for a particular partition at a given cluster site having multiple partitions to obtain a deciding vote from the presiding witness service as to which partition of the given cluster site is to continue to operate when there is a failure in the given cluster site.

* * * * *